(12) United States Patent
Hardge

(10) Patent No.: US 12,090,501 B1
(45) Date of Patent: Sep. 17, 2024

(54) WHEEL RIM PROTECTOR

(71) Applicant: Bernard C. Hardge, Dania Beach, FL (US)

(72) Inventor: Bernard C. Hardge, Dania Beach, FL (US)

(*) Notice: Subject to any disclaimer, the term of this patent is extended or adjusted under 35 U.S.C. 154(b) by 432 days.

(21) Appl. No.: 17/524,398

(22) Filed: Nov. 11, 2021

Related U.S. Application Data

(60) Provisional application No. 63/112,282, filed on Nov. 11, 2020.

(51) Int. Cl.
| | | |
|---|---|---|
| *B05B 12/30* | (2018.01) | |
| *B60B 7/00* | (2006.01) | |
| *B60B 7/01* | (2006.01) | |
| *B60B 7/06* | (2006.01) | |
| *B60S 3/04* | (2006.01) | |

(52) U.S. Cl.
CPC ............ *B05B 12/30* (2018.02); *B60B 7/00* (2013.01); *B60B 7/01* (2013.01); *B60B 7/063* (2013.01); *B60S 3/042* (2013.01)

(58) Field of Classification Search
CPC .. B60B 7/063; B60B 7/00; B60B 7/01; B05B 12/30; B60S 3/042
USPC ........................................ 301/37.103, 37.104
See application file for complete search history.

(56) References Cited

U.S. PATENT DOCUMENTS

| | | | |
|---|---|---|---|
| 2,627,839 A | 2/1953 | Hudgins et al. | |
| 3,854,448 A | 12/1974 | Kromanaker | |
| 4,628,858 A * | 12/1986 | King | B05B 12/30 |
| | | | 118/504 |
| 4,792,191 A * | 12/1988 | Farmer | B60B 7/00 |
| | | | 118/505 |
| 4,811,991 A | 3/1989 | Moreno et al. | |
| D336,460 S | 6/1993 | Marquez | |
| D337,090 S | 7/1993 | Wilfong, III | |
| D377,162 S | 1/1997 | Maynard | |
| D390,181 S | 2/1998 | Morrison | |
| 5,785,389 A * | 7/1998 | Bradford | B05B 12/30 |
| | | | 301/37.42 |
| 6,598,942 B1 * | 7/2003 | Williams | B60B 7/02 |
| | | | 301/37.104 |
| 6,905,177 B1 * | 6/2005 | Murillo | B60B 7/06 |
| | | | 301/37.104 |
| 7,374,248 B1 * | 5/2008 | Clayton | B60B 7/0073 |
| | | | 301/37.104 |
| 7,448,694 B1 * | 11/2008 | Bentley | B60B 7/08 |
| | | | 301/37.104 |
| 8,668,277 B2 | 3/2014 | Santana | |
| D776,037 S | 1/2017 | Fleck | |
| D796,412 S | 9/2017 | Aker, Jr. | |

(Continued)

*Primary Examiner* — Jason R Bellinger
(74) *Attorney, Agent, or Firm* — Cramer Patent & Design PLLC; Aaron R. Cramer

(57) ABSTRACT

A wheel rim protector is a device for safeguarding the rim of an automobile tire during the application of cleaning or decorative compositions in detailing processes. The protector is designed to be held by a user or temporarily attached to the rim. The wheel rim protector comprises a fan-like structure with multiple ribs pivotally connected to a handle, facilitating selective expansion and retraction. A shield, affixed to the ribs, includes magnets for magnetic attachment to ferromagnetic materials of the rim. The protector may be made from resilient and washable materials, which ensures durability and ease of maintenance in various detailing applications.

11 Claims, 5 Drawing Sheets

(56) References Cited

U.S. PATENT DOCUMENTS 10,029,271 B2    7/2018   Bartoli
D826,829 S      8/2018   Floyd, Sr.
11,219,913 B2 *   1/2022   Smith ........................ B60B 7/08

* cited by examiner

WHEEL RIM PROTECTOR

RELATED APPLICATIONS

The present invention was first described in and claims the benefit of U.S. Provisional Application No. 63/112,282 filed Nov. 11, 2020, the entire disclosures of which are incorporated herein by reference.

FIELD OF THE INVENTION

The present invention relates generally to a protective shield for placement on a rim of an automobile wheel when detailing the wheel.

BACKGROUND OF THE INVENTION

Many car enthusiasts enjoy taking care of their automobiles. From engine repair to detailing, people all over the world often spend hours of their free time cleaning and maintaining their automobiles.

For the true car enthusiast, one aspect of detailing which is often problematic is that of tire and wheel detailing. While many products exist which permit a tire to be brought to a like new-look or wet-look finish often times these products end up getting sprayed onto the rim of the wheel. When this occurs a tedious process of cleaning the rim is required. While many rim protectors exist which will prevent such over spray-they are often unwieldy and cumbersome. This being the case, a need exists for a wheel rim protector that is collapsible, portable and compact. The wheel rim protector accomplishes this task in a manner which is effective, safe and cost effective.

SUMMARY OF THE INVENTION

The inventor has recognized the aforementioned inherent problems and lack in the art and observed that there is a need for a wheel rim protector that has, a plurality of ribs attached at a first distal end to a handle via a pivoting connector, a shield affixed to the ribs, and a plurality of magnets affixed to one side of the shield.

Each of the ribs may be attached to the pivoting connector and may radiate outward in a fan-like spread. A quantity of the ribs and a length of the ribs may determine a plurality of dimensions of the wheel rim protector. The handle may have a size and shape adapted to enable a user to grip the wheel rim protector comfortably and securely. The handle may include a rectangular prism. The handle may be hollow. The pivoting connector may enable the ribs to pivot independently about the handle. The ribs may be attached to the pivoting connector on an exterior of the handle. The ribs may be disposed within an interior of the handle permitting travel of the ribs. The shield may be attached to a pair of sides of the ribs. The shield may be attached to one of the pair of sides of the ribs.

The shield may move in a complementary way with the ribs and is intended to cover all of the ribs and the spaces therebetween to provide a fan-like structure. The shield may be a semi-rigid unitary structure made out of the same material as the ribs and the handle. The shield may be the semi-rigid unitary structure made out of a more flexible material than the ribs and the handle. The magnets may be permanently integral with the shield. The magnets may be fully embedded within the shield. The magnets may extend away from a perimeter of the shield. The magnets may be flush with the perimeter of the shield. The magnets may be magnetically attached to the ribs made of a ferromagnetic material. The magnets may be flexible to enable at least a partial collapse of the wheel rim protector.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
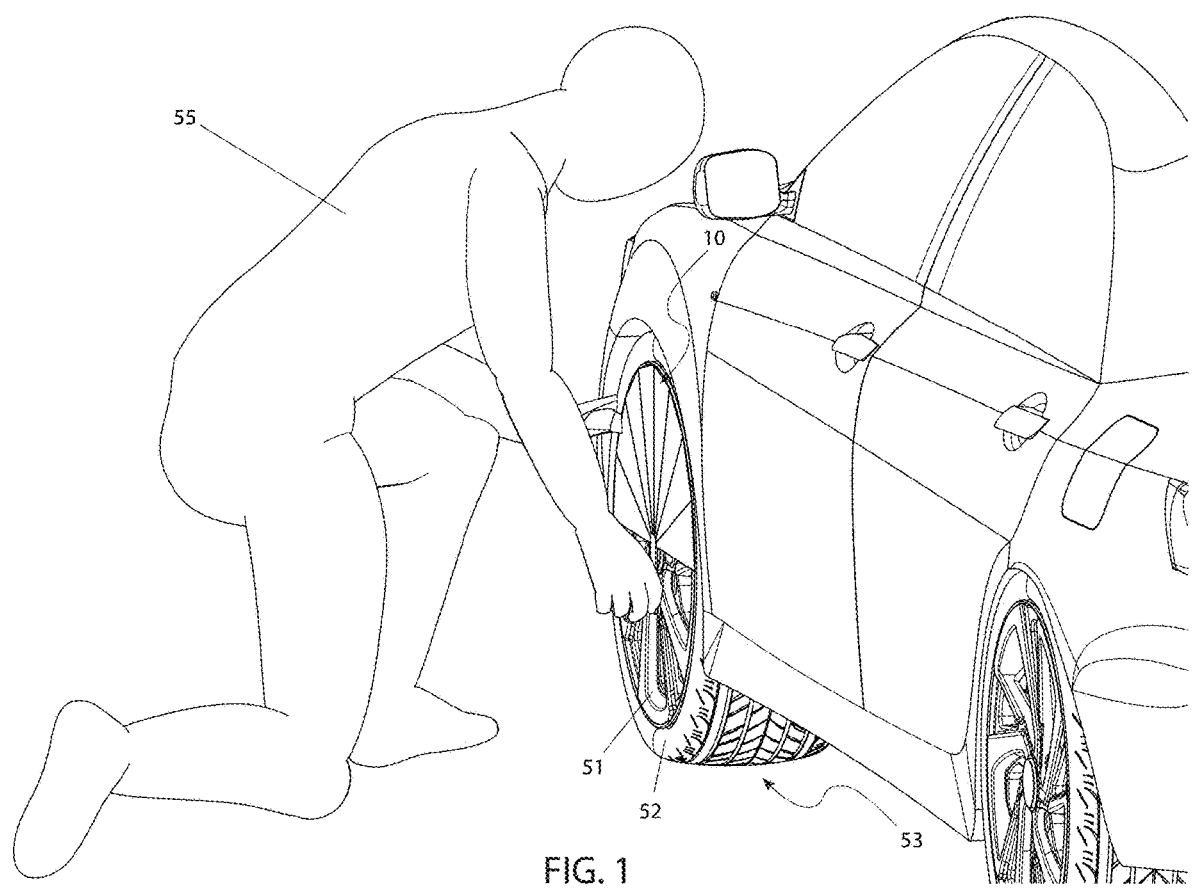
FIG. 1 is an environmental front elevation view of a wheel rim protector, according to the preferred embodiment of the present invention.
Figure 2:
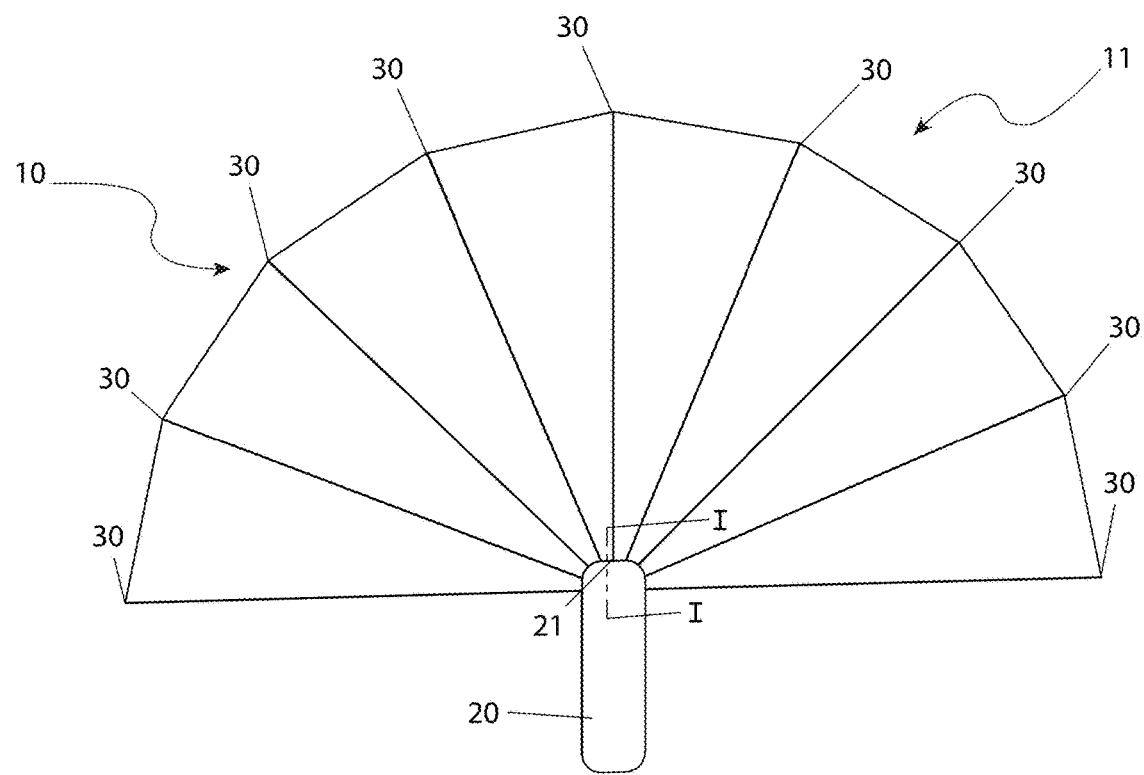
FIG. 2 is a front elevation view of the wheel rim protector, as shown in FIG. 1, according to the preferred embodiment of the present invention.

DESCRIPTIVE KEY 10 wheel rim protector
11 shield
13 pivoting connector
20 handle
21 opening
30 rib
40 magnet
51 rim
52 tire
53 wheel
55 user

DESCRIPTION OF THE INVENTION

The best mode for carrying out the invention is presented in terms of its preferred and alternate embodiments, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

A wheel rim protector 10 is herein described to provide protection to a rim 51 of an automobile wheel 53 during a process of applying a cleaning or decorative composition to the tire 52 in a detailing process. The wheel rim protector 10 is capable of being held by a user 55 when the applique is being administered, or alternately, the wheel rim protector 10 is capable of being temporarily attached to the rim 52. The wheel rim protector 10 in a preferred embodiment is envisioned to cover a portion of the rim 10 at a given time and is selectively expandable and retractable, given the desired locations of the composition application and size of the rim 51 to be protected. It is appreciated that the wheel rim protector 10 can be manufactured out of an inert and resilient material that is capable of being washed and cleaned and does not effectively deteriorate with respect to contact with the composition that is used.

Figure 6:
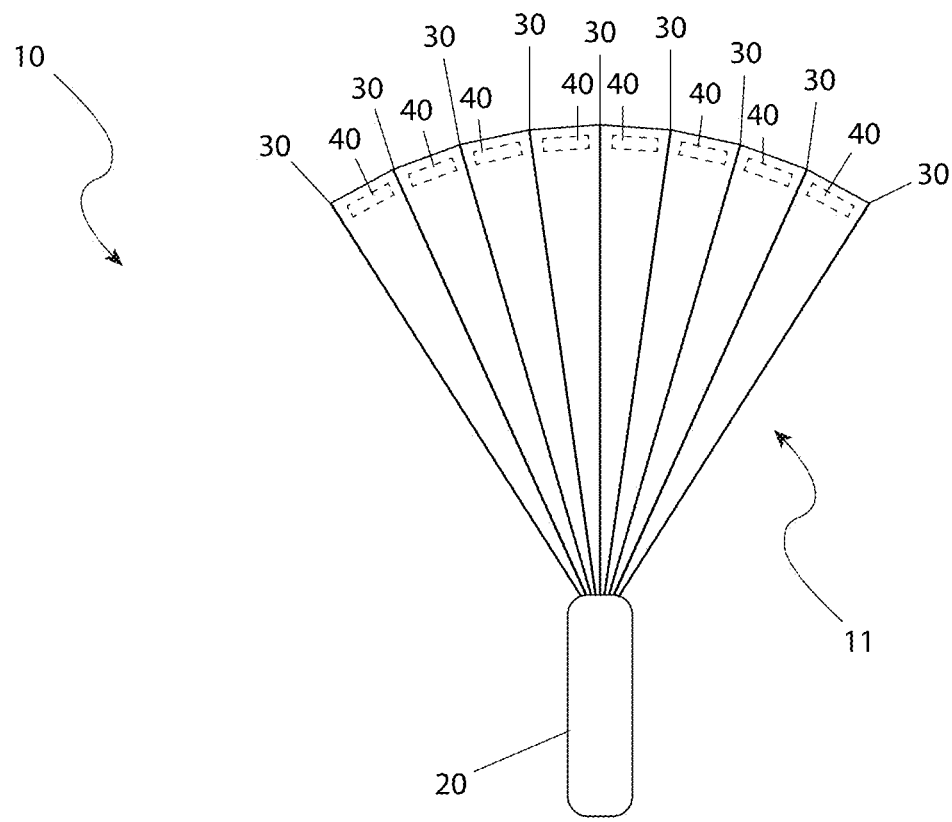
FIG. 6 is a rear elevation view of the wheel rim protector with the magnets concealed, as shown in FIG. 1, according to an alternate embodiment of the present invention.
Figure 7:
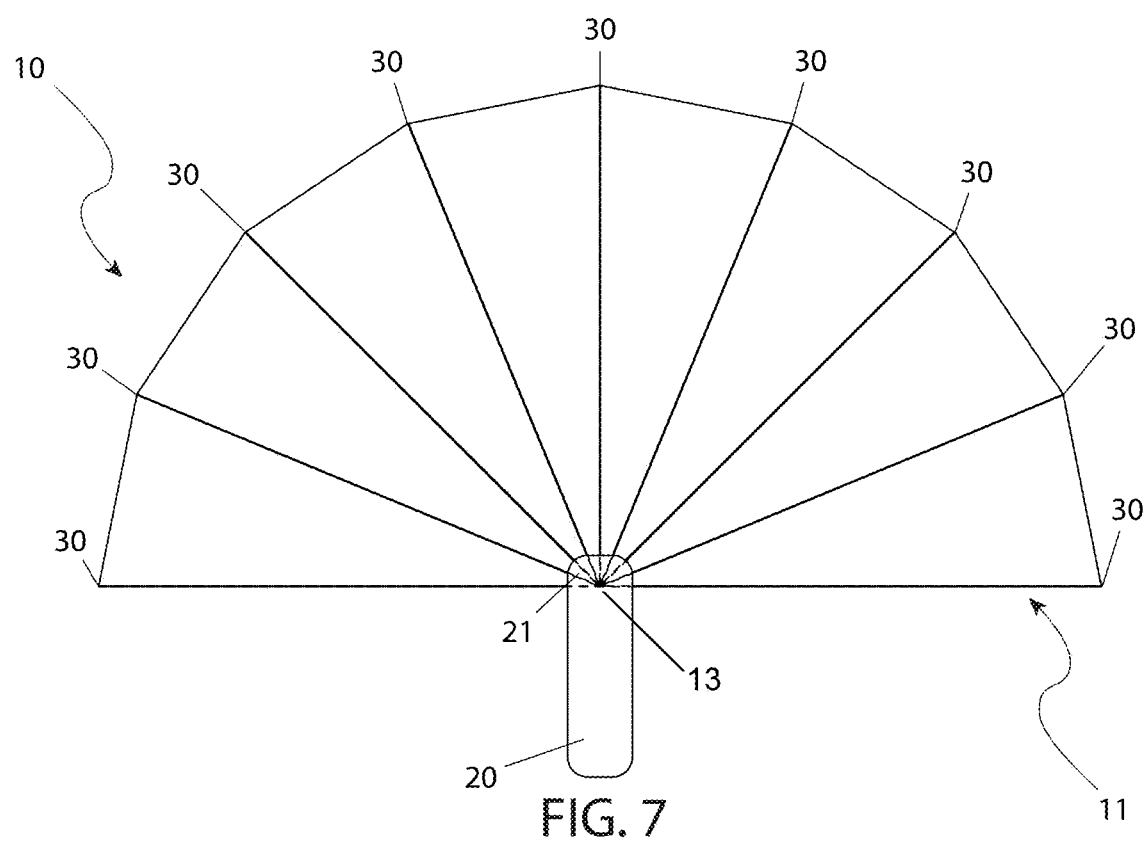
FIG. 7 is a front elevation view of the wheel rim protector, as shown in FIG. 1, according to another alternate embodiment of the present invention; and, FIG. 8 is a front elevation view of a wheel rim protector, according to an alternate embodiment of the present invention.
Figure 8:
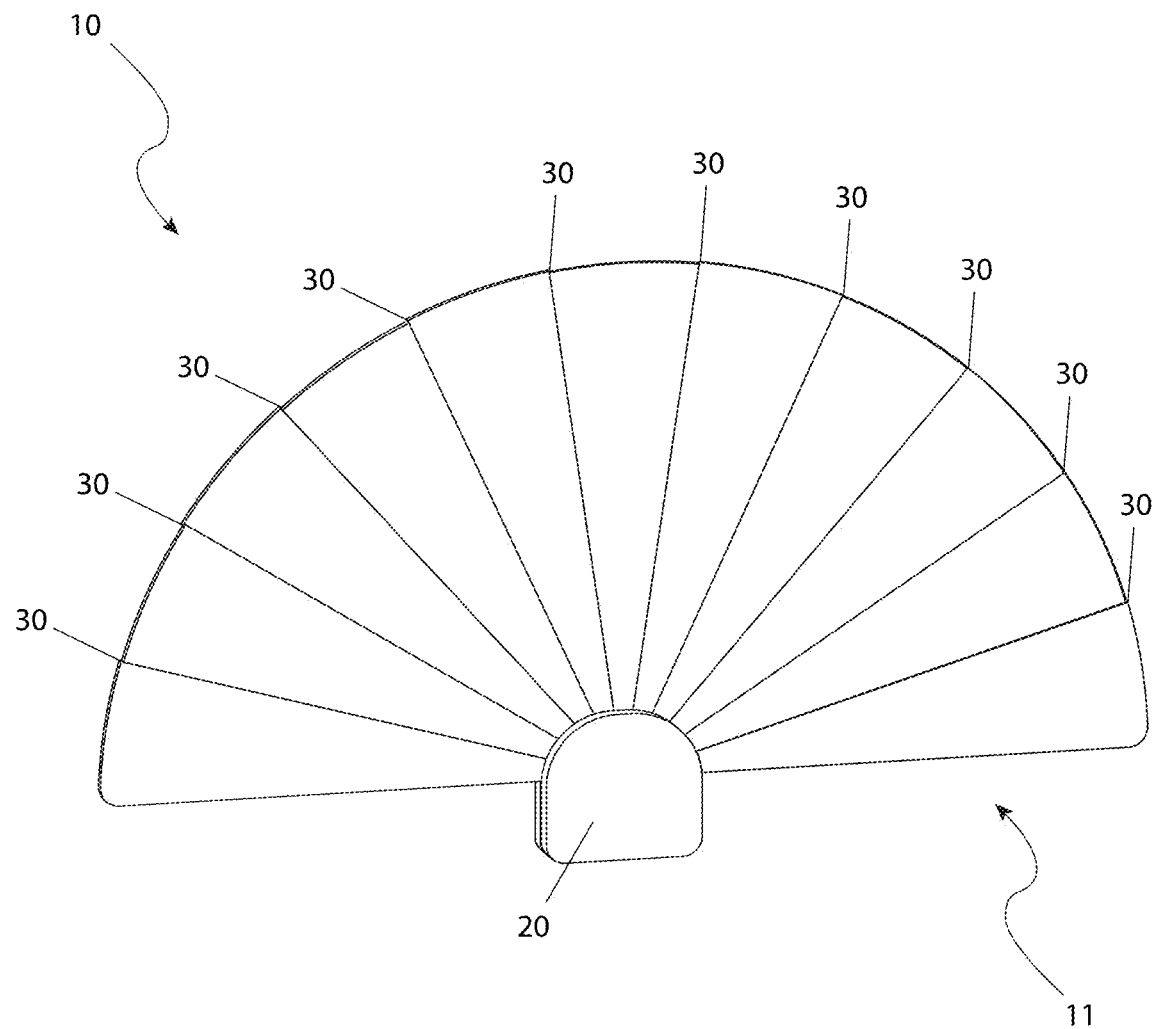

Referring now to FIGS. 1-8, the wheel rim protector 10 is stylized similar to an expanding fan, having a plurality of ribs 30, each attached at a first distal end to a handle 20 via a pivoting connector 13. The handle 20 is preferably a rectangular prism and is preferably hollow. The handle 20 is preferably of a size and shape enabling a user 55 to grip the wheel rim protector 10 comfortably and securely. The pivoting connector 13 enables the individual ribs 30 to pivot independently about the handle 20. Each rib 30 is attached to the pivoting connector 13 and radiates outward in a fan-like spread. The number of ribs 30 and length of the ribs 30 dictate the overall general size of the wheel rim protector 10. In an exemplary embodiment as shown in FIGS. 2-6, the number of ribs 30 may be nine (9). The ribs 30 may be attached to the pivoting connector 13 on an exterior of the handle 20 as can be seen in FIGS. 1-6, or in some instances, within the interior of the handle 20, such that the handle 20 may have an upper opening 21 permitting the travel of the ribs 30, as can be seen in FIG. 7. FIG. 8 illustrates an alternate embodiment of the overall wheel rim protector 10, more particularly illustrating the handle 20 with a wider, yet shorter design.

A shield 11 is affixed or otherwise attached to the ribs 30 and in some instances, also the handle 20. In other embodiments, the shield 11 may be attached to both sides of the ribs 30, just one (1) side of the ribs 30, or just certain amounts of the ribs 30. The shield 11 may be a semi-rigid unitary structure made out of the same material as the ribs 30 and handle 20, or a more flexible material than the ribs 30 and handle 20. The shield 11 moves in a complementary way with the movement of the ribs 30 and is intended to cover the entirety of the ribs 30 and the spaces therebetween to provide a fan-like structure.

Figure 3:
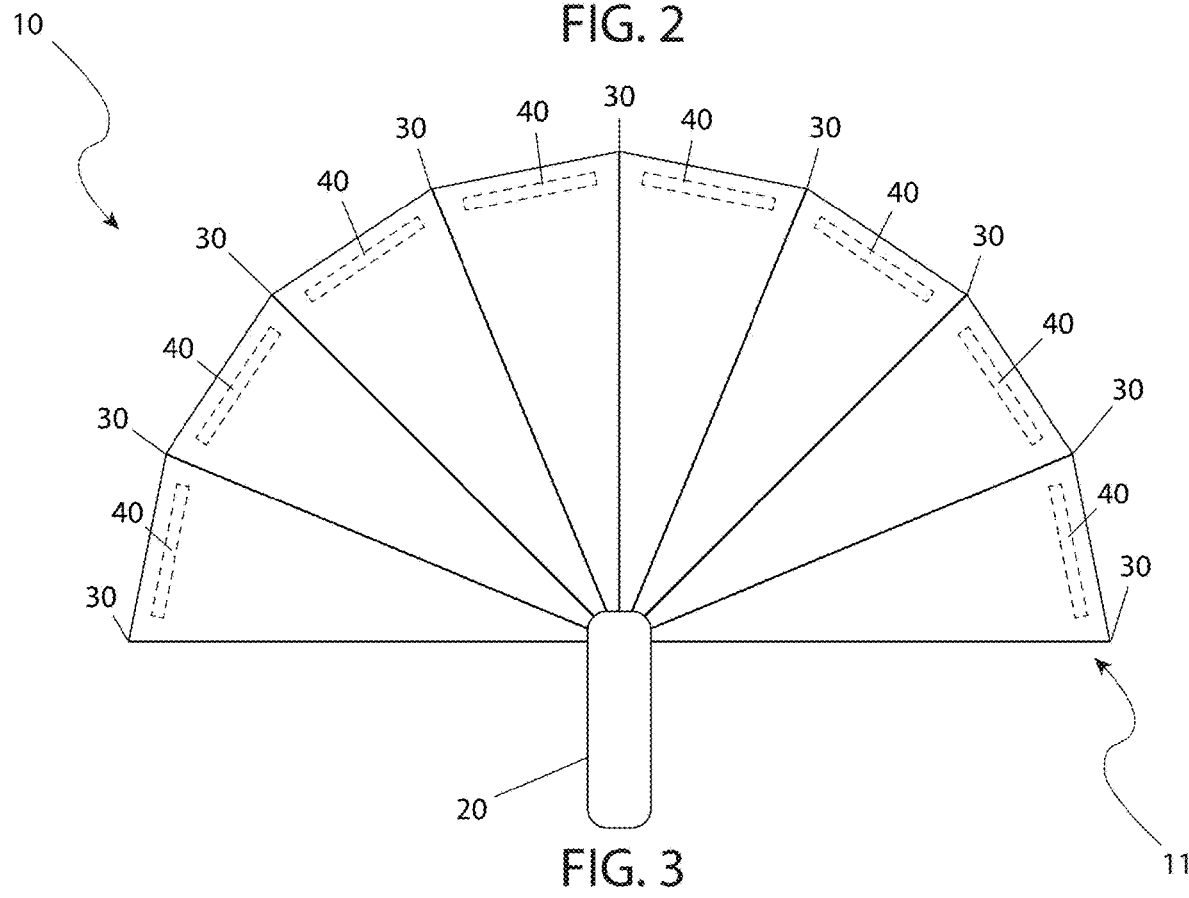
FIG. 3 is a rear elevation view of the wheel rim protector with the magnets visible, as shown in FIG. 1, according to the preferred embodiment of the present invention.
Figure 4:
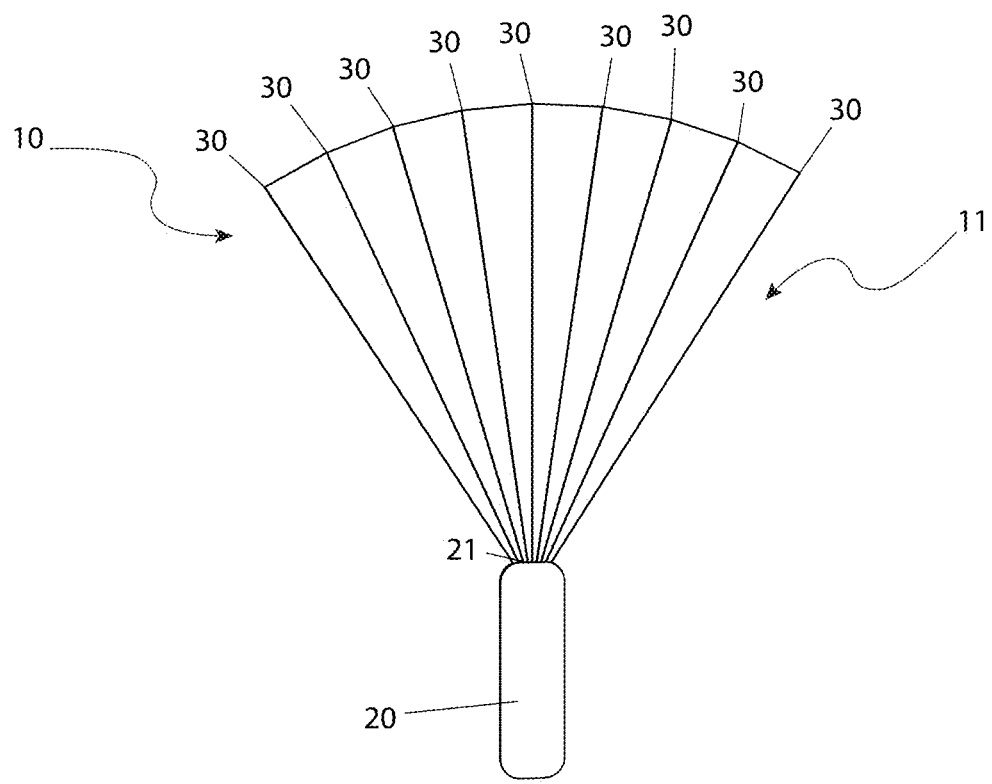
FIG. 4 is a front elevation view of the wheel rim protector shown collapsed, according to the preferred embodiment of the present invention.
Figure 5:
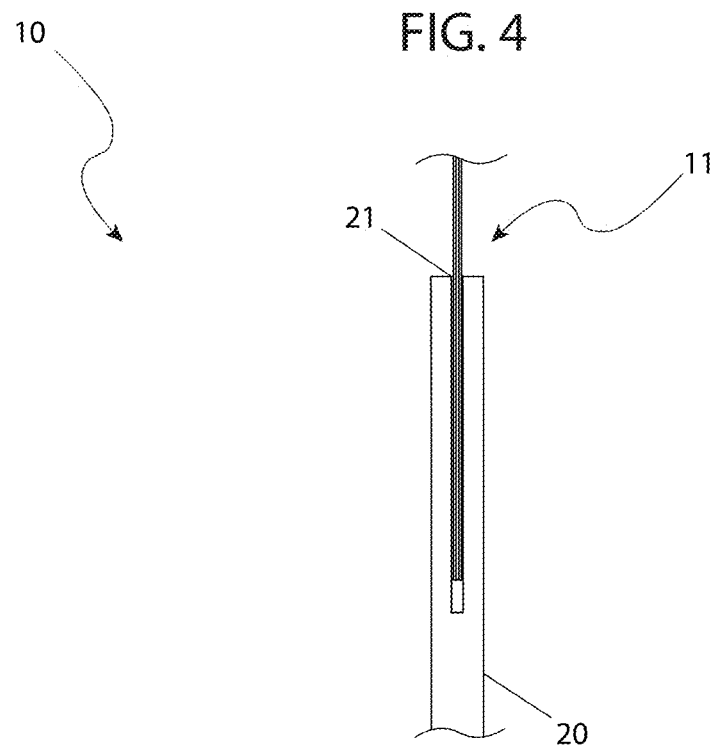
FIG. 5 is a cut-away view of the wheel rim protector along the sectional Line I-I (see FIG. 2), according to the preferred embodiment of the present invention.

Affixed to one (1) side of the shield 11 is a plurality of magnets 40. The magnets 40 may be permanently integral with the shield 11, or adhesively attached thereto. Other embodiments may provide the magnets 40 to be fully embedded within the shield 11, as can be seen in FIG. 6, or have a portion extending outward from either or both sides of the shield 11. In this manner, the magnets 40 may extend away from the perimeter of the shield 11 or be flush therewith. The magnets 11 may be positioned at any place on or within the shield 11, such as in an exemplary embodiment where they are positioned between each rib 30. The magnets 40 are capable of providing a magnetic attachment to ribs 30 having a ferromagnetic material of construction. In an exemplary embodiment, the magnets 40 are positioned on the outside surface of the shield 11 and rendered flush therewith, as can be seen in FIG. 3. The magnets 40 are located on the same side as the attachment location of the ribs 30 to the pivoting connector 13. It is this side that faces the rim 52 when in use. In some embodiments, the magnets 40 may be somewhat flexible to enable at least a partial collapse of the wheel rim protector 10. FIG. 8 may incorporate any of these functional embodiments, yet retains the overall design as illustrated herein.

What is claimed is:

1. A wheel rim protector, comprising:
   a plurality of ribs attached at a first distal end to a handle wherein a pivoting connector connects the plurality of ribs at a first distal end to the handle;
   a shield affixed to the ribs; and,
   a plurality of magnets affixed to one side of the shield; and,
   wherein the ribs are disposed within an interior of the handle permitting travel of the ribs;
   wherein the shield is attached to a pair of sides of the ribs;
   wherein the shield is the semi-rigid unitary structure made out of a more flexible material than the ribs and the handle; and,
   wherein the magnets are flexible to enable at least a partial collapse of the wheel rim protector.

2. The wheel rim protector, according to claim 1, wherein each of the ribs is attached to the pivoting connector and radiates outward in a fan-like spread.

3. The wheel rim protector, according to claim 1, wherein a quantity of the ribs and a length of the ribs determine a plurality of dimensions of the tire rim protector.

4. The wheel rim protector, according to claim 1, wherein the handle has a size and shape adapted to enable a user to grip the tire rim protector.

5. The wheel rim protector, according to claim 1, wherein the handle includes a rectangular prism.

6. The wheel rim protector, according to claim 1, wherein the pivoting connector enables the ribs to pivot independently about the handle.

7. The wheel rim protector, according to claim 1, wherein the ribs are attached to the pivoting connector on an exterior of the handle.

8. The wheel rim protector, according to claim 1, wherein the shield moves in a complementary way with the ribs and is intended to cover all of the ribs and the spaces therebetween to provide a fan-like structure.

9. The wheel rim protector, according to claim 1, wherein the shield is a semi-rigid unitary structure made out of the same material as the ribs and the handle.

10. The wheel rim protector, according to claim 1, wherein the magnets are permanently integral with the shield.

11. The wheel rim protector, according to claim 1, wherein the magnets are fully embedded within the shield.

* * * * *